Figure 1:
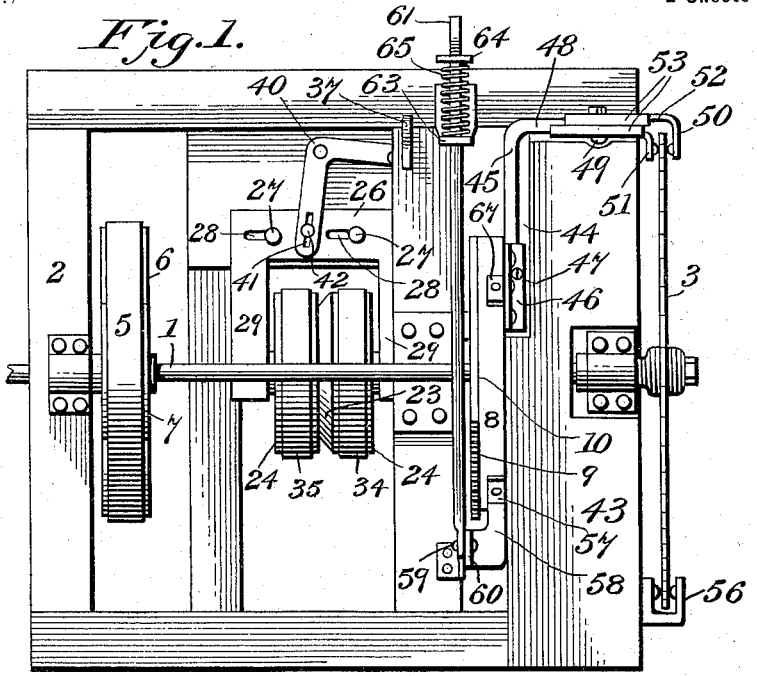

No. 639,411. Patented Dec. 19, 1899.
J. A. LEAF.
SAW GUIDE.
(Application filed Oct. 11, 1899.)
(No Model.) 2 Sheets—Sheet 1.

Witnesses
Edwin G. McKee.
R. M. Smith.

Inventor
John A. Leaf.
by C. G. Siggers
Attorney

No. 639,411. Patented Dec. 19, 1899.
J. A. LEAF.
SAW GUIDE.
(Application filed Oct. 11, 1899.)

(No Model.) 2 Sheets—Sheet 2.

Witnesses
Edwin G. McKee.
R. M. Smith.

Inventor
John A Leaf
by C. G. Siggers
Attorney

UNITED STATES PATENT OFFICE.

JOHN ALFRED LEAF, OF JEFFERSON, TEXAS.

SAW-GUIDE.

SPECIFICATION forming part of Letters Patent No. 639,411, dated December 19, 1899.

Application filed October 11, 1899. Serial No. 733,282. (No model.)

*To all whom it may concern:*

Be it known that I, JOHN ALFRED LEAF, a citizen of the United States, residing at Jefferson, in the county of Marion and State of Texas, have invented a new and useful Saw-Guide, of which the following is a specification.

This invention relates to saw-guides; and the object in view is to provide, in connection with a circular sawing machine, a guide and mechanism for raising and lowering or adjusting the saw-guide with relation to the saw, whereby the guide is enabled to properly brace the saw against lateral vibration. The mechanism for adjusting the position of the guide is driven from the same shaft which drives the saw-arbor, and in connection therewith a counter-shaft is employed, which is geared to the saw-guide arm and which has associated therewith clutch mechanism arranged to change or reverse the direction of rotation of the counter-shaft, and the said clutch mechanism is controlled by means of shipping devices, the nature of which will hereinafter appear.

Other objects of the invention will appear more fully in the course of the ensuing description.

The invention consists in certain novel features and details of construction and arrangement of parts, as hereinafter fully described, illustrated in the drawings, and incorporated in the claims.

Figure 2:
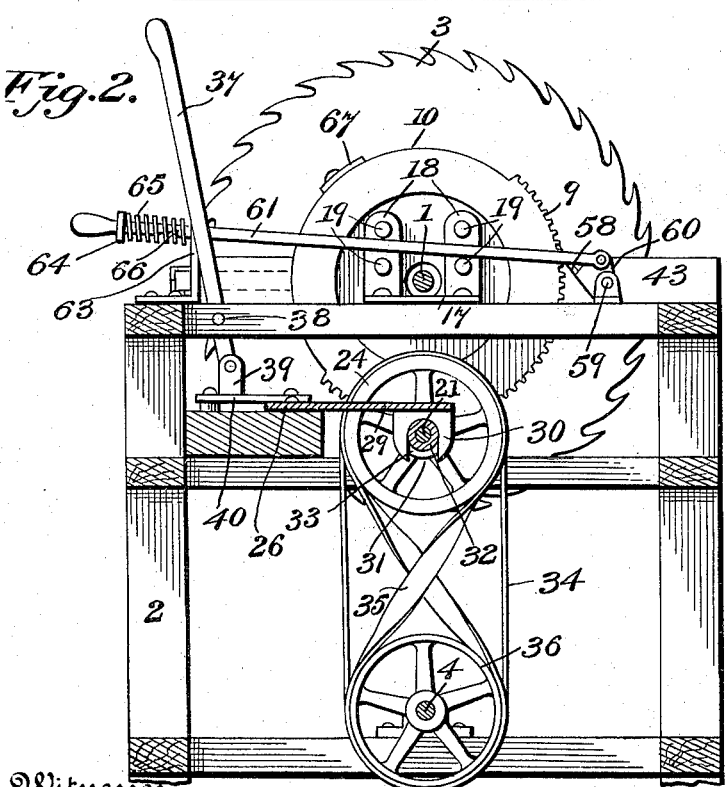
Figure 3:
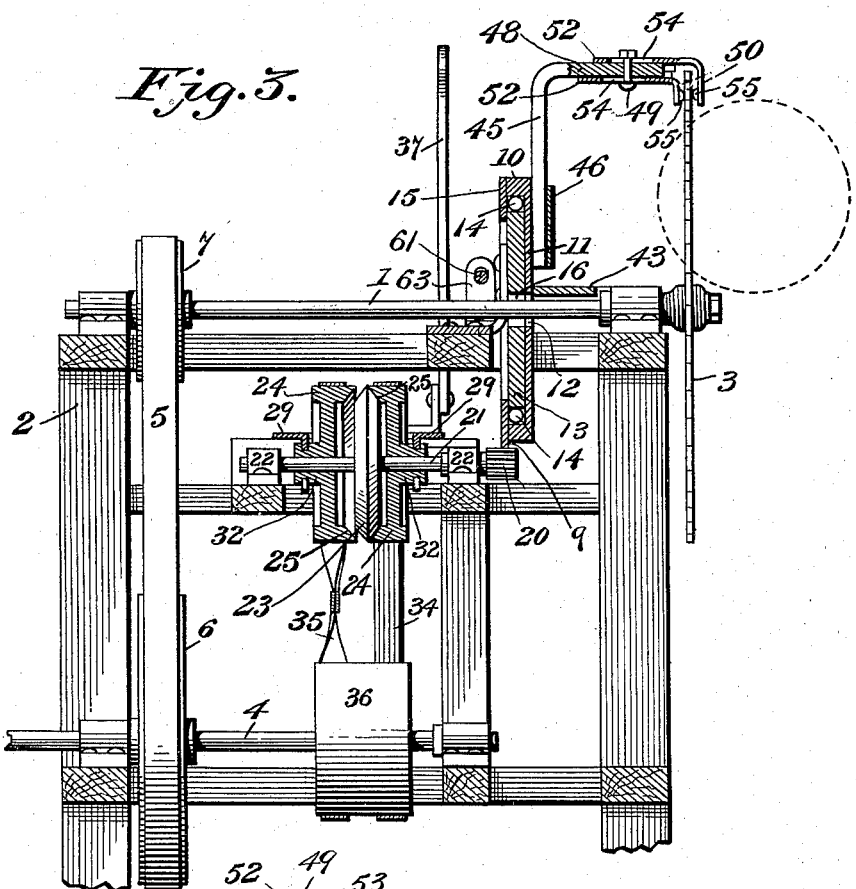
Figure 4:
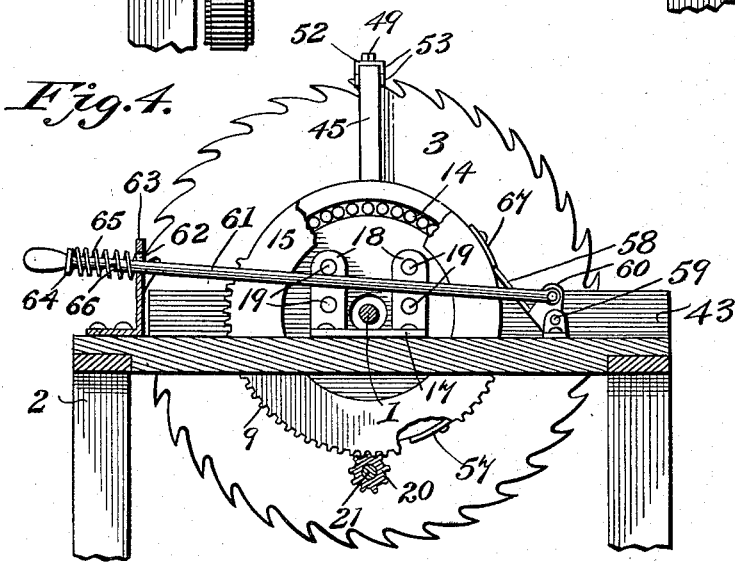

In the accompanying drawings, Figure 1 is a plan view of the circular sawing machine, showing the saw-guide and the operating means therefor. Fig. 2 is a vertical sectional view of the same, taken transversely of the saw-arbor and the shafts and adjacent to the shipping device. Fig. 3 is a vertical sectional view taken at right angles to Fig. 2 in line with the counter-shaft and saw-arbor. Fig. 4 is a sectional view of the upper portion of the machine, showing the gear-wheel which carries the saw-guide arm and the means for rocking said gear-wheel.

Similar numerals of reference designate corresponding parts in the several figures of the drawings.

In the drawings, 1 designates a saw-arbor mounted in bearings upon a suitable frame 2 and carrying a circular saw 3, said parts being arranged in any convenient or preferred manner. The driving-shaft 4 is geared to the arbor 1 for driving the latter by means of a suitable belt 5 and pulleys 6 and 7 on the driving-shaft and saw-arbor, respectively.

In carrying out the present invention I provide a gear-wheel 8, having peripheral teeth 9 on its rim portion 10 and also having a web portion 11, provided with a central opening 12, through which the saw-arbor passes. This gear-wheel 8 is mounted upon a bearing-disk 13, which is sufficiently smaller to allow ball-bearings 14 to be interposed between its periphery and the inner surface of the rim 10. An annular plate 15 is secured to the open side of the gear-wheel, against the rim 10, so as to confine the balls 14 in place. The bearing-disk 13 is provided with an opening 16, through which the saw-arbor passes. Said bearing-disk 13 is also held stationary and supported by means of a bracket secured to the frame of the machine. Said bracket comprises a base portion or flange 17 and uprights or standards 18, arranged on opposite sides of the saw-arbor, the bearing-disk 13 being bolted or otherwise secured to the standards 18, as shown at 19. The bearing-disk 13 is thus held stationary, while the gear-wheel 8 is allowed to rotate partially around the same.

The teeth 9 of the gear-wheel 8 mesh with a pinion 20, fast on a counter-shaft 21, journaled in suitable bearings 22 on the machine-frame, the disk 13 being actuated by said pinion. The counter-shaft 21 has fast thereon a double bevel-faced friction-wheel 23, which is interposed between a pair of clutch-pulleys 24, loosely mounted on the counter-shaft 21 and provided with correspondingly-beveled inner faces 25, which are designed to coöperate with the opposite beveled faces of the friction-wheel 23. The clutch-pulleys 24 are free to slide longitudinally on the counter-shaft 21 and are reciprocated by means of a shipper-plate 26, mounted slidingly upon an adjacent portion of the machine-frame and guided in its movements by means of pins 27, which pass through slots 28 in the shipper-plate. The plate 26 has parallel arms 29, with laterally bent or depending flanges 30, which are recessed, as shown at 31, to form forks which embrace the hubs 32 of the clutch-pulleys and engage in annular grooves 33 therein. The clutch-pulleys are thus yoked together by the shipper-plate and are simultaneously moved in the same direction when the shipper-plate is moved in a corresponding direction for the purpose of bringing one or the other of the clutch-pulleys into a frictional engagement with the wheel 25, according as to whether the guide-arm is to be raised or lowered. The clutch-pulleys 24 are driven in opposite directions by means of straight and crossed belts 34 and 35, respectively, passing around a common pulley 36 on the main driving-shaft 4, the guide-arm-actuating mechanism being thus driven from the same shaft as the saw-arbor.

In order to move the shipper-plate 26 a hand-lever 37 is employed, fulcrumed at 38 on the machine-frame and coupled at its lower end to an upwardly-extending arm 39 of an elbow-lever 40. The opposite end of the lever 40 is slotted at 41 to engage a pin 42 on the plate 26. The lever 37 is arranged at that side of the machine-frame at which the attendant or operator stands and is in a convenient position to be quickly manipulated.

The work-table 43 has its upper surface arranged above the saw-arbor and is cut away to form a recess 44, in which the saw-guide arm 45 and its socket are received when said parts are at the lower limit of their movement. The socket 46 consists of a plate secured to the side face of the gear-wheel 8, and the guide-arm 45 is adapted to be slid and adjusted therein and held by means of a binding-screw 47, whereby the arm may be lengthened and shortened to agree with the size of saw placed on the arbor. The outer portion of the guide-arm is bent laterally, as shown at 48, and provided with an opening to receive a clamping-bolt 49, by means of which guide-fingers 50 and 51 may be secured firmly to opposite sides of the guide-arm. Each of the guide-fingers 50 and 51 comprises a shank 52, which is flanged, as shown at 53, to embrace the upper and lower sides of the end portion of the guide-arm, as shown in Fig. 1, thus preventing the guide-fingers from canting or twisting upon the guide-arm. The shanks of the guide-fingers are also provided with longitudinal slots 54, through which the clamping-bolt 49 passes, thus enabling the guide-fingers to be adjusted relatively to each other and to the guide-arm for properly positioning them with relation to the saw. Each of the guide-fingers is also provided upon its inner surface with a projection or knob 55, and these knobs ride in contact with the opposite surfaces of the saw. A stationary saw-guide 56 is also provided at the opposite side of the saw to that upon which the movable or adjustable guide is located. When the guide is in its lower position, as shown in Fig. 1, it is located below the plane of the upper surface of the work-table 43.

In order to lock the saw-guide when lowered, I provide the gear-wheel with a stop-plate 57, secured to its periphery, as shown in Fig. 4, and in connection therewith I employ a stop-pawl 58, which is pivotally mounted at 59 on the machine-frame. The pawl 58 is provided with a lateral extension or ear 60 intermediate its ends, to which is pivotally connected an operating rod or handle 61, which passes through an opening 62 in a guide or keeper 63, also secured to the frame. The rod 61 is provided with a shoulder 64, forming a spring-seat against which one end of a spring 65 bears, the opposite end of the spring bearing against the guide 63. The rod 61 is provided with a catch-shoulder 66, which engages behind the upright portion of the keeper plate or guide 63, and when so engaged the stop-pawl 58 is held out of engagement with the stop 57, thereby enabling the gear-wheel 8 to be turned for adjusting the saw-guide arm. As soon as the shoulder 66 is disengaged from the keeper 63 the spring 65 acts to move the rod 61 longitudinally, throwing the pawl 58 against the periphery of the wheel 8 and holding it there until the stop-plate 57 comes in contact with said pawl, arresting the further movement of the gear-wheel and holding the guide at the lower limit of its movement. An additional stop-plate 67 is provided on the rim of the gear-wheel for limiting the upward movement of the guide-arm, as shown in Fig. 4.

When it is desired to elevate the saw-guide, the hand-lever 37 is moved outward at its upper end. This moves the shipper-plate to the position shown in Fig. 1 and carries the inner clutch-pulley 24 into frictional engagement with the friction-wheel 23, the parts assuming the position shown in Fig. 3. The gear-wheel 8 is now turned in a direction which will effect a raising of the guide-arm, and when the guide-fingers have attained the desired position to allow the log or work to pass beneath them the hand-lever 37 is pushed partially inward, so as to throw the clutch mechanism out of action, and the saw-guide will then remain in the position in which it is left while the log is being sawed. In order to lower the saw-guide arm, the lever 37 is pushed inward until the other clutch-pulley is thrown into engagement with the friction-wheel, the first clutch-plate being at the same time thrown out of engagement. This causes the counter-shaft to rotate in the opposite direction, and the direction in which the gear-wheel 8 is turned is also reversed, thereby effecting a lowering of the saw-guide arm. Before adjusting the saw-guide arm the stop-pawl 58 is thrown out of engagement with the gear-wheel 8, and the hand-lever 37 is then operated for the purpose stated. The rod 61 is then released, and when the guide-arm reaches the upper or lower limit of its movement one or the other of the stop-plates 57 and 67 will come in contact with the stop-pawl and prevent further rotation of the gear-wheel 8, the friction-surfaces of the engaging clutch-pulley and friction-wheel slipping past each other until the hand-lever 37 is properly adjusted to an intermediate point of its throw, thereby disengaging both of the clutch-pulleys from the friction-wheel 23.

From the foregoing it is thought that the construction, operation, and many advantages of the herein-described invention will be apparent to those skilled in the art without further description, and it will be understood that changes in the size, shape, proportion, and minor details of construction may be resorted to without departing from the spirit or sacrificing any of the advantages of the invention.

My improvement effects a saving of both power and material, as I am enabled to use thinner saws, thereby making the lumber of uniform thickness.

Having thus described the invention, what I claim as new, and desire to secure by Letters Patent, is—

1. The combination with a saw-arbor and driving-shaft, of a vibratory saw-guide arm, a counter-shaft geared to said arm, clutch mechanism associated with the counter-shaft, and means for adjusting the clutch mechanism to reverse the direction of rotation of the counter-shaft, substantially as and for the purpose specified.

2. The combination with a saw-arbor and driving-shaft, of a vibratory saw-guide arm, a counter-shaft geared to said arm, clutch mechanism associated with the counter-shaft and comprising oppositely-driven clutch-pulleys, and shipping mechanism for moving said pulleys and causing them to alternately clutch the shaft for reversing the direction of the counter-shaft, substantially as described.

3. The combination with a saw-arbor and a driving-shaft therefor, of a vibratory saw-guide arm having guide-fingers thereon, a counter-shaft driven from the main shaft and geared to the saw-guide arm, oppositely-driven clutch-pulleys loose on the counter-shaft, a friction-wheel fast on the counter-shaft between the clutch-pulleys, and shipping mechanism for said pulleys, substantially as described.

4. The combination with a saw-arbor and driving-shaft, of a vibratory saw-guide arm, a gear-wheel to which said arm is fastened, a stationary bearing-disk for said wheel having an opening, a counter-shaft passing through the disk, and having a pinion which meshes with the gear-wheel, a friction-wheel fast on the counter-shaft, oppositely-driven clutch-pulleys on the counter-shaft at opposite sides of the friction-wheel, and shipping mechanism for the pulleys, substantially as described.

5. The combination with a saw-arbor and driving-shaft, of a saw-guide arm, a counter-shaft geared to said arm, a friction-wheel fast on said shaft, oppositely-driven clutch-pulleys on the counter-shaft at opposite sides of the friction-wheel, a shipper-plate provided with forks which engage said clutch-pulleys and yoke the same together, and means for operating said shipper-plate, substantially as described.

6. The combination with a saw-arbor and driving-shaft, of a vibratory saw-guide arm, a gear-wheel to which said arm is fastened, driving means for said gear-wheel, and means for locking said wheel consisting of a stop-pawl for engaging shoulders on the wheel, and an operating-rod for said pawl, substantially as described.

7. The combination with a saw-arbor and driving-shaft, of a vibratory saw-guide arm, a wheel to which said arm is secured, means for turning said wheel, and locking mechanism for said wheel and guide-arm, consisting of a stop-pawl on the machine-frame, stop-shoulders on the wheel, an operating-rod connected to said pawl, a guide or keeper for said rod, a spring for giving said rod a normal tendency, and a catch-shoulder on the rod adapted to coöperate with the guide or keeper, substantially as described.

8. The combination with a saw-guide arm, of a pair of guide-fingers adapted to be arranged on opposite sides of the saw, and provided with flanged shanks which embrace the guide-arm, the shanks being further provided with longitudinal slots, and a clamping device on the guide-arm passing through said slots, whereby the guide-fingers may be adjusted relatively to each other and to the guide-arm, substantially as specified.

In testimony that I claim the foregoing as my own I have hereto affixed my signature in the presence of two witnesses.

JOHN ALFRED LEAF.

Witnesses:
W. A. SMITH,
LOUIS B. WEBSTER.